2,528,476

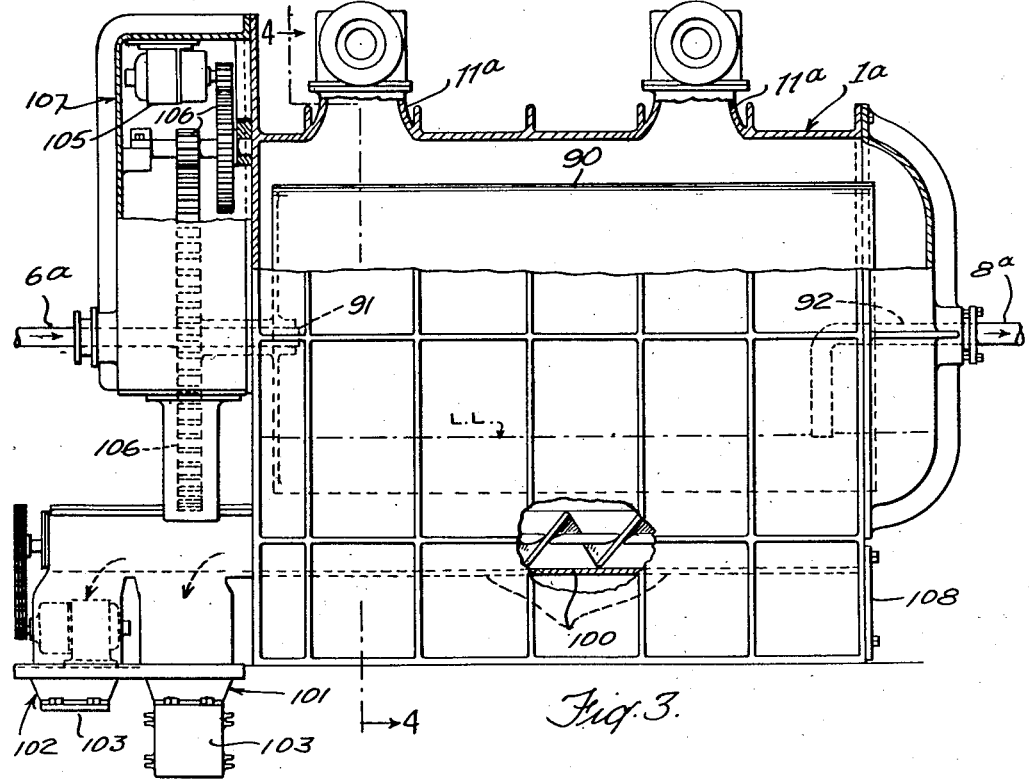
Fig. 3.
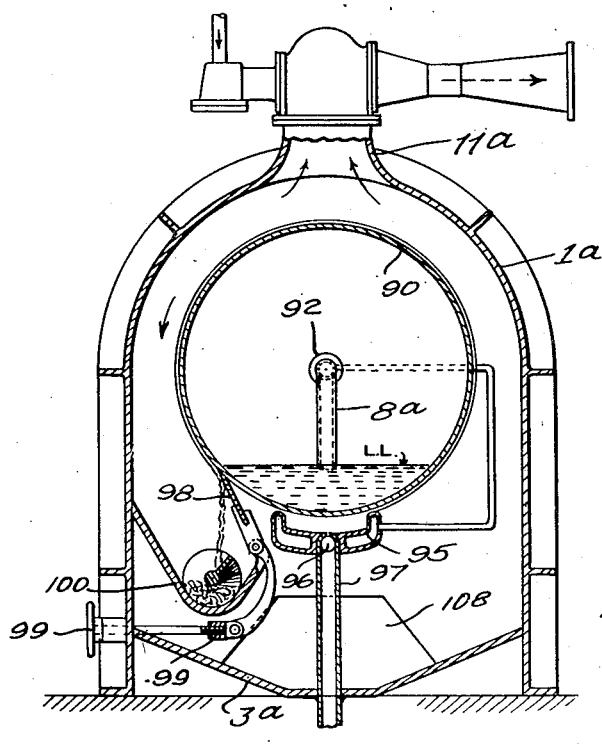
Fig. 4.
INVENTORS
RAYMOND B. ROOS
STEPHEN L. GALVIN
BY
ATTORNEY Patented Oct. 31, 1950

UNITED STATES PATENT OFFICE 2,528,476

METHOD AND APPARATUS FOR DEHYDRATION

Raymond B. Roos, Riverside, Conn., and Stephen L. Galvin, North Bergen, N. J., assignors, by mesne assignments, to Thomas Lipton, Inc., a corporation of Delaware Application March 20, 1942, Serial No. 435,514

7 Claims. (Cl. 34—5)

This invention relates to processes of and apparatus for drying foods and the like. More particularly the invention relates to such processes and apparatus in which the drying is effected at high vacuum, and especially to the process of and apparatus for drying in which the food or other material is kept under such conditions of pressure and temperature that the water is evaporated directly from the solid state.

In accordance with now widely practiced processes of freezing foods for preservation thereof it has been found that the flavor, firmness, texture, color and other physical qualities characteristic of fresh foods are satisfactorily maintained in foods which are kept frozen and especially when so-called "quick-freezing" is accomplished, but the storage and handling of foods in a frozen condition involve serious expense and difficulty.

It has also been widely practiced to preserve foods by removal of water to such an extent that organic action does not readily occur. As ordinarily practiced, such dehydration is not complete and usually results in some deterioration or change in the product so that it cannot be rehydrated to anything closely resembling the original substance, and usually can be rehydrated only slowly or with difficulty. It has, however, been shown experimentally prior to our invention that certain foods which are dried from the frozen state by evaporation of their contained ice, are not only much easier to rehydrate, but when rehydrated by simple addition of water and suitably prepared for consumption will resemble similarly prepared fresh materials, in flavor, texture and inherent values. Prior to the present invention, however, this latter process has been feasible only on laboratory scale and with products, such as blood sera, viruses, etc., wherein cost is not a primary consideration and preservation by other means is not possible. This process has not been feasible for the drying of foods or other quantity materials because it has required condensation of water vapor in an almost perfect vacuum—an expensive process requiring excessively large apparatus where large quantities of water are to be evaporated.

Vacuum drying of foods and industrial materials has, of course, been practiced commercially with continuous removal of water vapor from the vacuum apparatus together with any accompanying vapors or gases; but such processes have been operated only at much higher pressures. This has been done by steam jet ejectors, rotary and reciprocating pumps as well as by surface condensers. Extremely low pressures have also been attained commercially by similar types of apparatus in the operation of various processes for cleaning articles or substances of contained and adsorbed air, moisture or other gases; but the volume of gases handled in such processes are insignificant as compared to the volume of water vapor produced in the drying of frozen foods or other substances containing large proportions of water (which will be referred to herein generally as "hydrous" substances). The practical significance of this difference may be realized when it is recalled that at the freezing point of water (0° C.) the saturated vapor pressure is just under 4.6 mm. of mercury (all pressures stated in mm. herein refer to the barometric mercury column) and at this pressure one pound of water occupies more than 3300 cubic feet. At $-10°$ C. the vapor pressure is less than 2 mm. and the volume occupied by the gas nearly two and one-half times as great; and with a suitable further reduction in pressure to assure a flow of the water vapor over and into contact with the enormous surface area necessary for condensation of the water vapor from a reasonable commercial quantity of meat, vegetables or fruit, even this volume of the water vapor must be multiplied several times over. Thus, for example, if the water vapor is condensed at 0.5 mm. the volume will be more than 300,000 cubic feet of water vapor per pound of water content evaporated.

Because of the recognized practical difficulties of handling such excessively large volumes of vapor and the evident costs involved, it has been the universal practice in the vacuum drying of frozen hydrous substances to condense the water vapor within the vacuum chamber either by (1) refrigerated surfaces maintained at such excessively low temperatures as correspond to water vapor pressures well below 1 mm. of mercury column; (2) chemical absorbents such as sulfuric acid, phosphoric anhydride, anhydrous calcium sulfate and other known desiccants; or (3) physical adsorption on active surfaces. Fixed gases have been removed from the drying apparatus by vacuum pumps or by sweeping the space with a vapor, the residue of which is taken up or condensed by the absorbents used for condensing the water vapor.

In contrast to these prior processes, the present invention operates by direct removal of water vapor together with any fixed gases which may be in the dehydrating chamber or which may be permitted to leak or be carried into the chamber.

It is an object of this invention to make the advantages of the ice evaporation method available for drying of foods and other products at low cost and in large quantities.

Another object of this invention is to dry foods and other hydrous substances by evaporation and removal of water from the frozen state at high vacuum, but to avoid the necessity of maintaining prohibitively low pressures.

Another object of the invention is to reduce the size and cost of apparatus required for such drying.

Another method of this invention is to provide for continuous drying of such substances with continuous removal of evaporated water from the drying apparatus.

It is a feature of the invention that the dehydration of the food, etc., is accomplished in its frozen condition and particularly that the water is removed therefrom by evaporation directly from its frozen state. In order to accomplish the evaporation of frozen water content it is necessary that proper conditions of temperature and subatmospheric pressure be maintained. If pure ice were to be evaporated and its temperature could be perfectly controlled the drying would be at 0° C., and the pressure would be just under 4.6 mm. of mercury. Actually, however, the water in foods contains dissolved substances, which lower the melting point somewhat below 0° C., depending upon the particular material concerned, and some factor of safety is required to protect against fluctuations and inequalities of temperature so that the substance being dried will usually be several degrees below zero. The vapor pressures which correspond to these temperatures are much lower than are commonly dealt with in vacuum processes and apparatus for dehydrating foods and where such pressures have been encountered, e. g., in manufacture of electric lamps and radio tubes and in so-called "molecular distillation" processes, such pressures have been attainable only by high vacuum pumps of low volume capacity, which would be wholly impracticable for the purposes of this invention. Moreover, in all vacuum drying of frozen hydrous substances before the present invention, an additional reduction of pressure actually has been necessary in any practical apparatus in order to maintain a satisfactory flow of the vapor, as formed, away from the surface of the drying substance and eventually to the point of removal. By use of the present invention, it is now made feasible to avoid excessively low pressures which would make such process unfeasible.

It is a particular feature of the present invention, in contrast to all previously known processes of dehydrating by ice evaporation, that the water vaporized and removed from the food is continuously removed from the vacuum apparatus together with air or other non-condensable or superheated gases or vapors, if any are present in the chamber, without requiring separation of such gases or condensation of the water vapor in the vacuum apparatus. This removal may be effected in accordance with an accelerated rate of evaporation of the water from the food to the vapor state within the dehydrating chamber, which rate may be established by heating of the frozen product. This continuous removal is effective continuously to maintain the low pressure of the vapor requisite for evaporation of the frozen water content of the food and hence to maintain the temperature below freezing. This continuous removal moreover lends itself to the maintenance of uniform conditions, if desired, and affords opportunity adequately to control and to vary at will the conditions of freezing and evaporation.

The material to be dehydrated may be pre-frozen and put into the vacuum chamber in a frozen condition or it may be frozen by the vacuum, the evaporation of water, due to the vacuum, withdrawing heat from the material until it is completely frozen.

The introduction and removal of the food, or other material to be dehydrated, into and from the drying chamber may be continuous or in batch. With those materials which are in liquid form, such continuous delivery into the dehydrating chamber may be readily accomplished by feeding therein through a suitable control valve or restricted passage under the head of the atmospheric pressure above the internal low pressure of the dehydrating chamber. With special apparatus such as rotary or sliding chamber valves, the dehydrated material also may be continuously withdrawn from the dehydrating chamber as it reaches a desired point of dehydration. And, by similar apparatus, non-fluid materials may be fed into a continuous drier. Advantageously the substance to be dried should be degassed and/or precooled to control foaming of the material when first fed into the vacuum chamber.

Drying of the frozen substance will advantageously be continuous to and below the freezing point until so much of the contained water has been removed that a temperature rise above the freezing point of water will not cause a reversion to the liquid phase. Such continuity, however, is not necessary and a similar result will be obtained if the hydrous substance is kept frozen even though drying may be interrupted and even though the vacuum may be broken from time to time.

In a typical operation, the food may be contained within or delivered into a dehydrating chamber, and this chamber sealed except for connection to a vacuum apparatus of the ejector type by which the water vapor and any gases and other vapors are driven off by a jet of an auxiliary fluid. By thus using an ejector type of apparatus directly operating on the evaporating space and with suitable choice of ejecting fluid and of the number of stages of ejection the requisite reduction of the vapor pressure together with the simultaneous removal of the water vapor, gases and other vapors may be accomplished.

Contrary to the previously accepted assumptions, it is not necessary to maintain pressures too low for successful use of such ejector type apparatus. By providing direct and continuous flow of vapors out through the ejector from the material being dried, the present invention makes it feasible to operate with a relatively low pressure head between the evaporating surface and the point of exit from the chamber. Whereas the condensation of vapors within the vacuum chamber requires a relatively high pressure drop from the evaporating surface of the material to the point at which the vapor is condensed, it is shown by the present invention that a major part of this pressure drop or "head" is required to draw the vapors over and into contact with the necessarily extensive condensing surfaces. The invention eliminates all necessity for that and requires only enough pressure drop to cause a flow of the material away from the evaporating surfaces and toward the exit passage. Although the saving thus effected may be only a few millimeters—or even a fraction of a millimeter—in the pressure range concerned one or two millimeters difference in pressure may mean a doubling of the volume of vapors to be handled. Thus, the process of direct removal of vapors achieves very important economies and improvements in operation, which make the difference between experiment and practical utility.

Although in this specification and the accompanying drawings there is shown and described a preferred embodiment of the invention and various modifications thereof and various alternatives are suggested, these are not intended to be exhaustive nor limiting of the invention, but on the contrary are given for the purpose of illustrating and explaining the invention and instructing others in the principles thereof and the best manner of utilizing the invention in practical use, in order that others skilled in the art may be enabled to modify and apply the invention in numerous forms each as may be best suited to the conditions and requirements of any particular use.

In these drawings:

Figure 3 is a view partly in elevation and partly in longitudinal vertical section, showing a continuous dehydrating chamber particularly designed for treatment of liquid materials;

Figure 4 is a view in cross-section taken on line 4—4 of Figure 3; and

Figure 5 is a diagrammatic view in cross-section of another modification of apparatus embodying and carrying out the invention.

Figure 2:
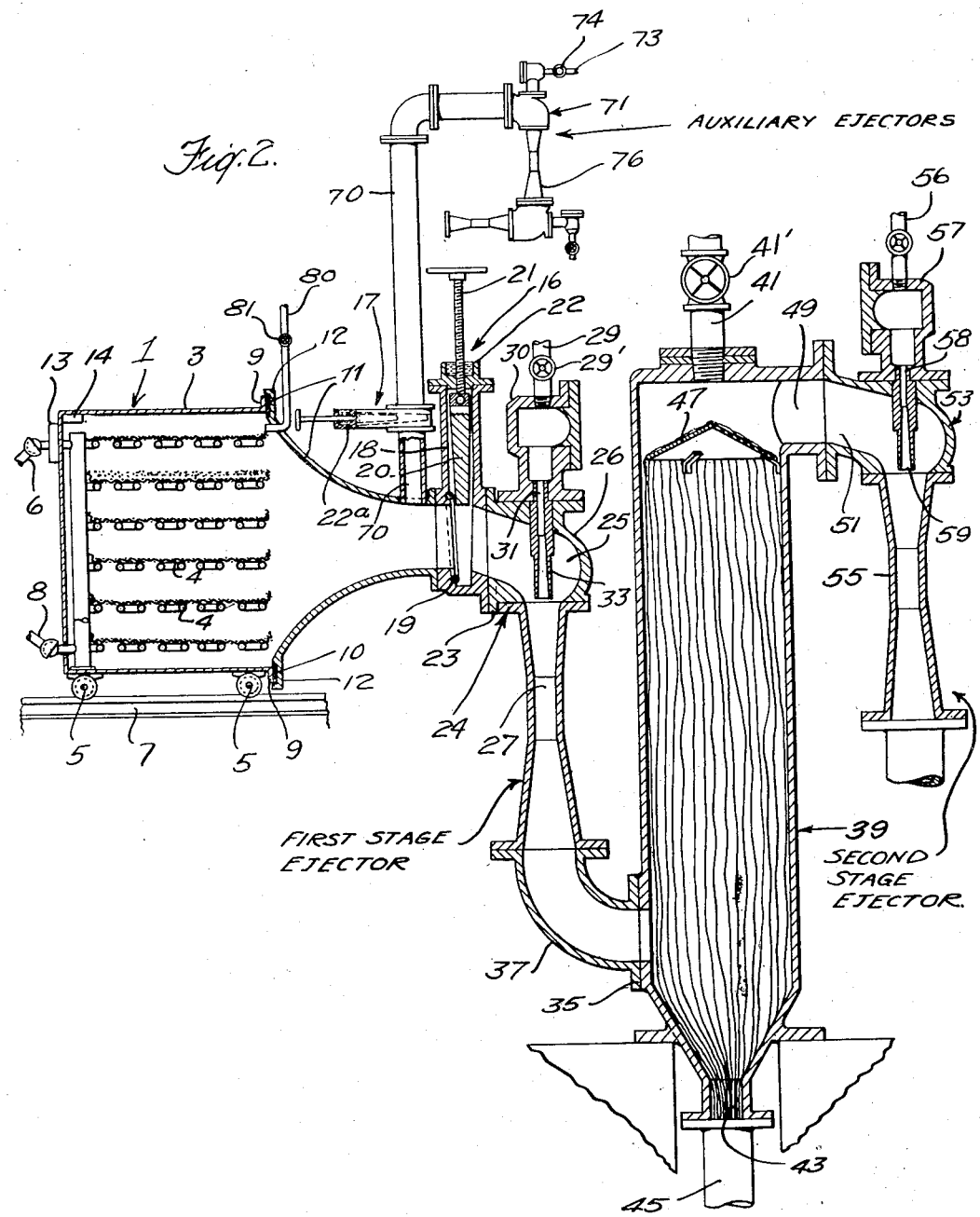
Figure 2 is a view in vertical section of a preferred apparatus as shown in Figure 1, but with additional ejector stages.

The drying or sublimation chamber 1 consists of a shell 3 which may be conveniently mounted on wheels 5 running on tracks 7 so as to provide for movement of the shell 3 away from the remainder of the apparatus for loading and discharge of the food or other material to be dried. As best shown in Figure 2, the shell 3 is open at the right thereof and is provided with a flange 9 and gasket 10, e. g., of rubber or other gas-impervious flexible material, to interfit with the end of the throat portion 11 having flange 12 suitably machined to provide a tight joint with the flange 9. Clamps (not shown) may be applied to the flanges to draw them together during initial evacuation. Once a substantial vacuum is established the pressure of the atmosphere will press the shell 3 securely against the throat portion 11.

All parts of this apparatus should, of course, be made to withstand the full pressure of the atmosphere, and preferably the apparatus should be painted with an impervious film to cure any porosity which may exist in the metals of which it is made.

Within the shell 3 are mounted vertically spaced shelves 4 which may be arranged in horizontal position to provide a large area for support of the food to be dried. These shelves 4 may be formed as open grilles of connected piping through which a heating fluid may be circulated. The piping is welded or brazed or otherwise sealed through the shell 3 with a vacuum-tight joint and outside the shell is detachably connected to the hot water lines or other source of heating fluid by detachable flexible or hinged connections 6 and 8.

An electrically controlled valve 13 in the hot water line regulates the flow of the hot water or other heating fluid into and through the shelves 4; and this valve 13 is controlled by a pressure responsive relay 14, being opened thereby when the pressure drops below a predetermined limit, e. g., 2.5 mm. and being closed again if the pressure rises above a predetermined value, e. g., 3.0 mm. Or, by use of a visual manometer and a window in the shell 3, the flow in the piping 6—4—8 can be manually controlled to maintain the desired vapor pressure.

The heating control above referred to may be any of the various types of devices available for this purpose as, for example, a mercury column manometer having a U-tube sealed and fully evacuated on one leg by filling with mercury, the other leg being open to the atmosphere within the chamber 1, and having contacts sealed through the wall of the tube in such position that their points just touch the surface of the mercury at the low limit of the pressure range which is to be maintained. These contacts are connected into the grid circuit of an electronic tube the plate circuit of which operates the motor, e. g., a solenoid, of the electrically operated valve 13, either directly or through further stages of amplification or through an electromagnetic relay. Another well known device for this purpose uses a metal bellows which is moved against its own resiliency by changes in the pressure to which it is exposed. Such a bellows if large enough may be connected directly to the valve to operate it mechanically or it may carry electrical contacts by which its movement makes and breaks a motor circuit for energizing a solenoid or other valve-operating motor. If desired the operation of the ejector or its condenser may be controlled by the pressure, and the heating may be kept constant. Thus either or both of the valves 29' and 41' may be electrically operated by the circuit of the pressure relay 14.

A gate valve 16 of special construction closes the end of the throat 11 when desired; and a similar gate valve 17 closes the throat from the auxiliary connection 70. These gate valves as shown consist of housing 18 with openings registering with those of the throat, a gasket 19, e. g., of dense rubber around the opening, a gate 20 loosely fitting the inside of the housing 18 but with clearance slightly less than the projection of the gasket 19 therein, and an operating screw 21 rotatably secured to the gate 20 and threaded through the end of the housing 18. A well 22 or 22a seals the valve against air leaks by carrying a pool of heavy oil, mercury or other liquid which will not leak along the accurately fitted screw threads. When the gate 20 is closed and the chamber 3 is evacuated, the external pressure presses the gate against the gasket 19 and maintains a perfect seal.

The gate valve 16 on the end of the throat 11 is secured to the flange 23 of the suction or inlet opening of the ejector 24. (All fastenings are omitted in the drawings, it being understood that bolts, clamps, welds or other available means may be used.)

This ejector 24 is of a known design: The flanged suction opening 23 leading to a chamber 25 within the body 26; the outlet conduit 27 from this chamber 25, being of a form and of such reduced cross-sectional area as to insure and maintain suction producing velocities within this outlet conduit 27, and thus to create in the chamber 25 the requisite reduction in pressure; and steam or other suitable fluid for prodcing the suction being introduced through the pipe 29, the head 30, and the nozzle 33 tightly fitted into the head 30 in the opening 31 for discharge of the steam or other velocity creating fluid and directing it into the conduit 27. The nozzle 33 is of such form that upon reduction of the pressure of the steam, for example, from 100 lbs. pressure as it enters through the opening 31 a sharp increase in velocity of the steam is produced which carries it into and through the conduit 27 at high velocity. The form of the nozzle 33 and of the conduit 27 may be designed in accordance with known principles and practice in consideration of the volume of gases or vapors or both to be removed from the chamber 1 and the requisite reduction of pressure in the chamber 25. The amount of the steam introduced through the nozzle 33 is such that, at the reduced pressure corresponding to the expansion of the steam in the nozzle and in consideration of the cross-section of the conduit 27, the velocity of the steam and of the gases and vapors in said conduit shall be maintained to insure their positive discharge from the conduit 27 to exhaust or to a suitable condensing chamber 39.

In Figure 2, such a condenser is shown connected to the flanged end 35 of the conduit 27, by means of the flanged elbow 37. Condensing water is introduced through the inlet pipe 41 at the top of the condensing chamber 39 and the condensed steam received from the conduit 37 and any condensable vapors are discharged through a barometric leg or tail pipe 45 and suction pump from the bottom opening 43 of the condensing chamber. As shown in Figure 2, this outlet is a barometric leg 45 for conducting away the condensed steam and condensing water under a hydrostatic head equal to the full suction obtainable in the condenser but, as is well understood a suction or tail pipe pump may be connected to the lower end of a shorter pipe for discharge of the water flowing therethrough if the necessary height for the full barometric leg cannot readily be made available. The condensate and cooling water from the barometric leg or tail pipe may be discharged to a suitable run-off or may be cooled and recirculated as is well understood in common ejector suction apparatus.

Figure 1:
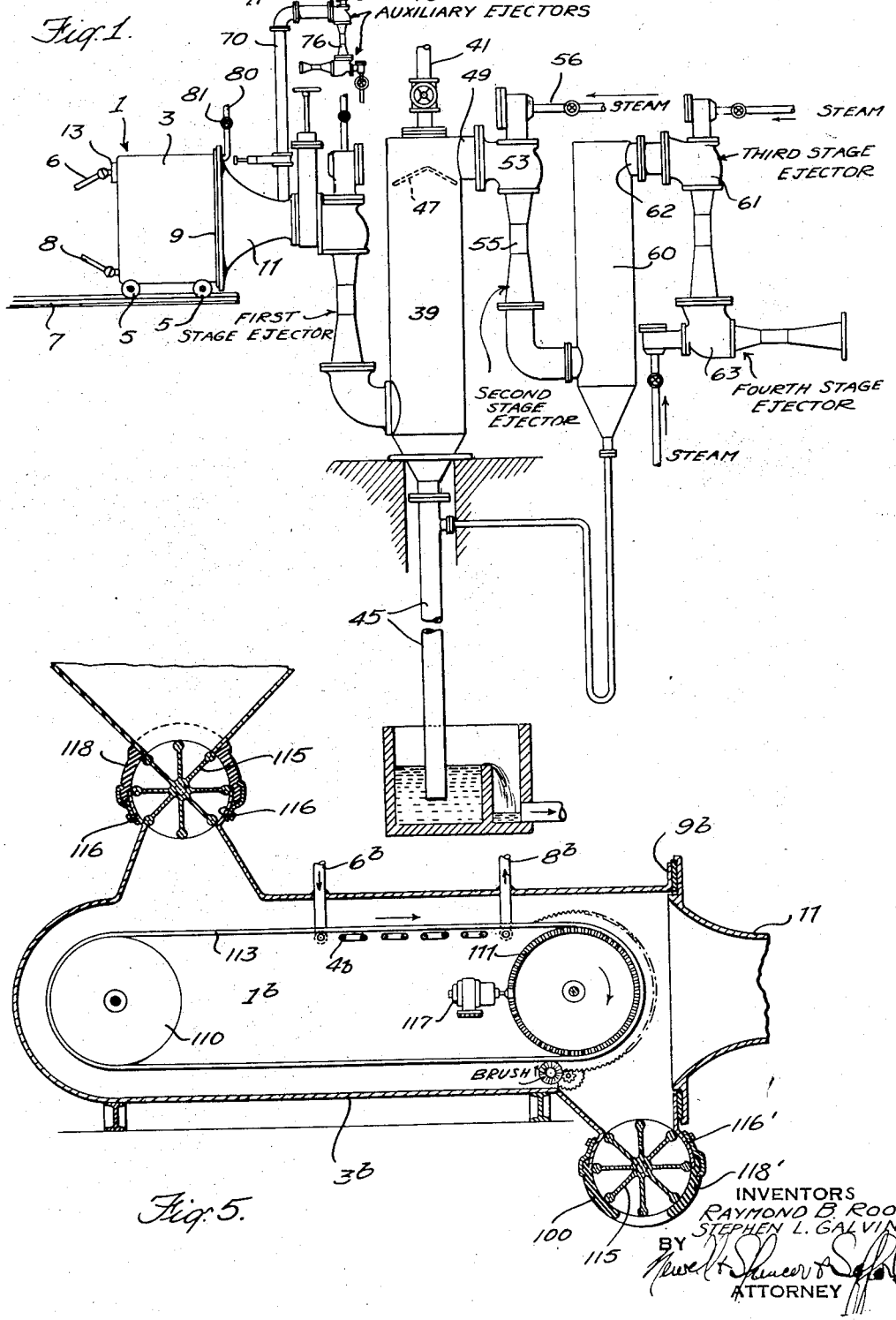
Figure 1 is a diagrammatic view in elevation with parts in vertical section of the dehydration chamber and two stages of ejection of an apparatus embodying the invention.

The internal construction of the condenser chamber 39 is not a part of the present invention. This chamber may be constructed, however, with baffles or tortuous channels or sub-divided passages in accord with established practice to insure ample contact of the condensing water with the steam to be condensed and the condensable vapors carried thereby. In the particular design illustrated, the water delivered through the pipe 41 is delivered upon a cone de-deflector 47 to create a curtain or veil of water into contact with which the steam is forced to flow from the inlet opening at the end of pipe 37 towards the outlet opening 49. As illustrated in Figures 1 and 2, the diameter of the cone 47 may be such, relative to the internal diameter of the chamber 39, that the annular space between the annular curtain of water and the wall of the chamber 39 is somewhat limited. The steam may pass up along the wall but also may tend to break through the curtain and back again in its flow toward the outlet opening 49 of the chamber 39, thus insuring more intimate contact with the condensing water.

Suitably fastened to the outlet opening 49 is the flanged suction opening 51 of a second-stage ejector body 53 similar in construction to the first ejector member. This second ejector, like the first, is connected to a second velocity producing and maintaining conduit 55. A steam line 56 supplies steam through the head 57 and the opening 58 to the nozzle 59 formed suitably to expand the steam received from the head 57 with a sharp increase of velocity and to blast its flow into the conduit 55 in order to entrain and carry through the conduit 55 at high velocity the gases and uncondensable vapors received through the opening 49. If desired, the discharge opening from the conduit 55 may be further connected to a condenser 60 as shown in Figure 1, of barometric type similar to the condenser 39 or to other suitable condensing or receiving apparatus.

A third-stage ejector 61 similar to the first and second ejectors described above is connected to the gas and vapor outlet 62 of the condenser 60, and this may discharge through a suitable condenser or be exhausted to the atmosphere, or additional stages may be used, e. g., as shown at 63, to give more perfect vacuum in the chamber 3.

In Figures 1 and 2, an auxiliary discharge line 70 is shown connected into the throat 11 connected to an auxiliary ejector 71 of similar construction to the ejectors above described. This auxiliary ejector may be supplied with steam through the pipe 73, controlled by valve 74 and a discharge through opening 76, which may be connected to a suitable pipe for leading away the steam and vapors withdrawn from the chamber 1, by the auxiliary ejector. This ejector may be of relatively small size as compared with that of the main first-stage ejector and may be of single or multi-stage design. It is used, either alone or with the final stage ejector or ejectors 61—63, to reduce the pressure within the chamber 1 from atmospheric pressure, when first closed to a point where it becomes economical to operate the larger, higher capacity ejectors, which are designed primarily for maintaining very low vacuums. The ejector 71 may, therefore, be designed so as to be capable only of reducing the pressure from atmosphere down to a vacuum of e. g., 15–20 mm. of mercury absolute pressure.

This auxiliary ejector, however, is not essential and may be omitted; in which case the first operation may be with the final stage ejector only, continuing such operation until a predetermined pressure reduction has been attained, then bringing successively into operation the ejectors of earlier stages together with their respective condensers, until the entire ejector apparatus is operating.

A pipe 80 controlled by the valve 81 may be sealed into the throat 11 and connected at its outer end to a suitable supply of dry, and preferably sterile, inert gas, e. g., nitrogen or carbon dioxide, or may be open at its outer end to the atmosphere, for breaking the vacuum after drying is completed. The use of inert gas for this purpose is desirable in that the gas thus introduced into the evacuated material is physically adsorbed and very strongly held by the porous material and, therefore, protects it against deterioration, by subsequent exposure to the atmosphere.

In the operation of the device described above, the shell 3 is rolled along the track 7 away from the throat 11 to a loading station where fresh or pre-frozen fruit, vegetable, or meat, or other material to be dried is distributed on the shelves 4. The shell is then pushed against the throat and the flanges 9—12 clamped or pressed together to seal the shell 3 to the throat 11. The heating connections 6—8 are coupled to the piping of the shelves 4 and the gate valve 17 is opened, the gate valve 16 being left closed.

The auxiliary steam ejector 71 is then started in operation and continued until the pressure in the shell 3 is lowered about to the limit of the capacity of the ejector 71. The main ejectors 25, 53, 61, etc., and the condensers 39, 60 are then set in operation and the gate valve 16 opened and the valve 17 is closed. Or the several stages of main ejectors and condensers may be brought into operation successively beginning with the outer, e. g., the third double stage 61, 63, and the earlier, e. g., the second and first stages subsequently brought into operation.

Instead of using the auxiliary ejector 71 or exhausting atmospheric gas by bringing the several stage ejectors successively into operation, in some cases it is advantageous to first pass steam through the drying chamber 1, so as to sweep out substantially all of the air and uncondensable gases and at the same time to give the material on the shelves therein a preliminary blanching, sterilization, or partial cooking, after which the pressure may be quickly reduced by operation of the ejectors, the steam which remains in the vacuum chamber 3 being then quickly drawn off and condensed in the condensers of the evacuating apparatus.

When the full operation of the ejectors has reduced the pressure within the dehydrating chamber 1, e. g., to below about 3 mm., the heating fluid is opened into the piping of the shelves 4. The consequent heating of the materials on the shelves increases the rate of evaporation, but if this rate should exceed the capacity of the ejectors to remove the resulting vapor, the pressure would begin to rise and when a predetermined pressure is reached further heating would be restricted or interrupted by operation of the pressure responsive relay 14 and the valve 13 until such time as the ejectors have been able to catch up. Thus, thawing of the frozen material is avoided by keeping the pressure always below the vapor pressure of water in the liquid phase, while the full efficiency and capacity of the apparatus for removal of water vapor is utilized.

Due to the fact that, as the material dries, a growing thickness thereof is left in a porous heat insulating condition, it is necessary to offset this by raising the temperature of the heating fluid or otherwise increasing the heating. This will raise the temperature of the dried layers nearest the heating surfaces, but in their dried condition this will be unobjectionable. In the case of the automatic control 13—14 this increase in heating occurs automatically since the heating is at all times controlled to keep the vapor pressure at the predetermined optimum. If such pressure responsive control is not used, it is desirable to regulate the heating by other means to effect such a progressive increase.

If the material had not been pre-frozen before putting into the shell 3, it will be frozen by the cooling effect of evaporation of water therefrom as soon as the pressure drops below about 4 mm. (the exact pressure depending upon the melting point and, therefore, upon the concentration of dissolved substances in the fluids of the particular substance being dried).

It will be apparent from the description above given, moreover, that the operation of the main ejectors is continuous, that having effected the requisite reduction in pressure within the chamber 1, these ejectors maintain this reduced pressure and corresponding low temperature for evaporation of the frozen water content of the food concomitantly with the continuous removal of the water vapor, together with any gases or vapors occurring at said pressure and temperature within the chamber 1. Not only may constant conditions, therefore, be maintained within the chamber 1 for the evaporation of the water content of the food and the avoidance of varying conditions of temperature which might result in thawing, and consequent deterioration of the product, but as the water vapor is formed and passes from the food into the space within the chamber 1, it is constantly removed so that drying action upon the food also is effected under constant conditions. An efficient drying process, therefore, is made possible with preservation of the quality of the food to a degree not heretofore attained in any practical process.

In contrast to methods and apparatus of the prior art, this apparatus utilizes the ejector action of an auxiliary fluid and secures the requisite reduction in pressure over the surface of the drying material in the chamber 1 without requiring prohibitively low pressures within the apparatus.

The ejector type of apparatus described, which provides for direct removal of vapors and utilizes high velocities of flow of the fluids being handled, not only effects reduction of the size and cost of apparatus from that previously used, but also makes possible the operation thereof at less over-all difference in pressure between the surface of the material being dried and the point of least pressure toward which the vapors flow. Thus, in the apparatus of the invention, to maintain a pressure at the evaporating surfaces within the chamber 1, e. g., at 3.0 mm. of mercury, the minimum pressure established by the evacuating apparatus, e. g., at the entrance to the chamber 25, may be 2.0 or even 2.5 mm. of mercury; and the resulting rate of vapor removal will be greater than has heretofore been possible in the drying of frozen substances.

It should be understood, of course, that the invention is not limited to any particular number of stages of ejectors. More or less than those shown may be used, depending upon the material to be dried and the particular type of apparatus used, and the pressure of steam or other fluid available for operating the ejectors. Several ejectors or condensers can also be used in multiple in place of a single larger ejector or condenser.

The operation as described above is continued until the material is sufficiently dried, which will be indicated by a substantial decrease of vapor pressure notwithstanding adequate heating of the shelves 4. When this occurs, or after it has been allowed to continue for a suitable period of final drying, the gate valve 16 will be closed to exclude any return of water vapor from the ejectors and condensers, and the valve 81 opened to admit a dry atmosphere and break the vacuum. Whereupon the drying chamber 1 will be released from the apparatus and rolled off to an unloading station where the dried material will be removed and packed for storage and shipment. Meanwhile, a second chamber already loaded may be rolled up in place of the first and the drying cycle repeated.

In some cases, and particularly where it is desired to leave a substantial degree of moisture within the dried material, it may be desirable to close the valves 16 and 17 and discontinue the operation of the evacuating apparatus before the drying is entirely completed and the drying chamber left thus sealed at relatively high vacuum for a period during which evaporation continues from the innermost portions of the material whereas moisture is absorbed to some degree by the previously dried outermost portions; and thus a greater uniformity of distribution of the moisture is obtained. This phase of drying without further evacuation may be begun as soon as the water content has been reduced to such extent that it does not to any substantial degree form a liquid phase upon thawing but is held as moisture in the partially dried solids. After this condition has been reached, the material can be safely heated to atmospheric temperature or substantially higher and it is, therefore, within the scope of our invention to stop the ejectors at such time, seal the vacuum chamber 1 by closing the gate valve 16 and utilize the residual vacuum with continued heating of grids 4 for a further period during which some water vapor will be given off by the material up to the vapor pressure of water at the temperature of the material on the grids 4. This will be many times the pressure of the vapor after the active dehydration of the frozen material.

Instead of sealing the chamber during this final treatment, the operation of the ejectors may be reduced gradually, e. g., by cutting down and/or discontinuing one or more stages of ejection. Thus operation might be continued for a time with only the second and third stages, thus allowing a rise of pressure within the chamber 1 with a concomitant rise of the temperature of the material on the shelves 4.

In Figures 3 and 4, there is shown another embodiment of the invention designed particularly for the drying of liquid materials in continuous operation.

In this case the drying chamber 16 is approximately fitted to a drum 90, mounted on trunnions 91 and 92 secured to the supporting framework of the chamber at opposite ends thereof. The trunnions 91 and 92 are hollow and fitted with the heating fluid connections 6a and 8a. The connection 8a continues inside of the drying drum 90 in a suction or syphon pipe by which the condensate level and desired sub-atmospheric pressure may be maintained. There are, of course, many other heating arrangements which are available; and any of these may be chosen as practical engineering considerations may dictate; but there is important advantage in the pool of condensate, which is maintained by this arrangement in the bottom of the drum. This condensate is kept cool by the rapid evaporation of the freshly applied substance from the pan 95, and thus serves to chill the drum and prevent overheating of the film in the last moments of its drying before it is scraped off from the drum.

Below the drum 90 is the pan 95 which serves as a distributing head having at its center a spray or pipe 96 connected to an inlet pipe 97 suitably sealed, e. g., by welding or brazing, through the shell 3a of the drying chamber. This pipe 97 is connected with a suitable source (not shown) of a liquid material to be dried, such for example, as milk, tomato juice, orange juice, egg whites and/or yolks, blood, or rubber latex, etc. Extending laterally from the pipe 96 the distributing head 95 is a steam jacketed pan suitably connected to the heating connections 6a and 8a. The liquid material is flowed through spaced perforations or a narrow slit in the pipe 96 from which it sprays onto the surface of the drum. Such of the liquid as does not immediately adhere to the drum falls back into the pan 95 where it is again entrained with the jet from the pipe 96, or by boiling under the influence of the high vacuum and heat of the pan is thrown once more against the surface of the drum. The edges of the pan 95 are brought close to the drum to avoid drift of atomized liquid off to other parts of the apparatus. This will also serve to keep the vapor pressure in the pan 95 somewhat above that in the chamber 1a and thereby to prevent freezing of the liquid before it is applied to the drum.

A scraper blade 98 is hingedly mounted adjacent the drum 90 below its horizontal diameter on the far side of the drum, that is to say about 3 quadrants from the distributing head 95 in the direction of rotation; and is pressed against the drum by the manual screw adjustments 99 or other suitable means.

Beneath the scraper 98 a screw conveyor trough 100 is provided for carrying off the dried material which is scraped from the drum. This conveyor feeds alternatively into either of two receptacles 101 or 102, each of which may be sealed off from the chamber by a top closure (not shown) and may be sealed off from the outer atmosphere by the bottom closure 103. One of these receptacles 101 or 102 is closed at the bottom and opened at the top to receive material from the conveyor 100 while the other is closed at the top and opened at the bottom for discharging the material collected therein. These receptacles may be connected to separate vacuum pumps or ejectors to remove most of the air from them after they are closed at 103 and before they are opened again into the chamber 1a.

At the top of the chamber 1a it is formed into several throats 11a which connect with an evacuating apparatus which may be substantially the same as that shown in Figure 2.

The drive for rotating the drum is shown as an electric motor 105 and reduction gearing 106 all enclosed within a vacuum tight housing 107.

Except for the features especially described herein the apparatus may be substantially like vacuum drum driers which are commonly used and commercially available for drying at moderate temperatures.

In the operation of this device, in accordance with our invention, the ejectors and condensers or other evacuating apparatus are set into operation and this operation continued until an operating vacuum is established, e. g., equivalent to water vapor pressure less than 4 mm. and preferably around 3 mm. or less. The motor 105 is then set in operation and the drum 90 slowly rotated thereby, whereupon the liquid material to be dried may be supplied through the pipes 97 and 96 and the distributing head 95.

The liquid material as soon as it leaves the distributing head 95 is immediately subjected to rapid evaporation and is rapidly chilled thereby. In order to facilitate freezing on the surface of the drum, we preferably maintain a vaccum within the drum 90 and supply exhaust steam (or even water vapor at sub-atmospheric pressure) which heats the exposed surfaces of the drum, but eventually condenses at low temperature and may be further cooled in the zone at the bottom of the drum.

As the drum continues to rotate, the material will be brought beyond the level of the cold condensate and the tendency to further reduction of its temperature by evaporation will then be counteracted by the heat supplied from the steam within the drum, and this supply of heat will continue the rapid rate of evaporation from the material on the surface of the drum. As the drum continues to rotate, therefore, the frozen water within the material continues to evaporate until the water content of the material is so far reduced that the temperature of the drying material is no longer held to the boiling point of water, whereupon the temperature rises automatically to one at which further evaporation occurs sufficient to counterbalance the heating or until the material is so far dried that the material reaches substantially the temperature of the drum. Thus, when the material reaches the scraper 98, it is sufficiently dried so that it can be scraped off the drum in film, flake or powdery form and discharged by the conveyor 100 into one of the receptacles 101 or 102 from which it may be released into the open atmosphere or fed into packaging containers while still under vacuum or in a special inert atmosphere.

If the material is fully dried when it is scraped from the drum some may fly off as a powder beyond the conveyor 100, and likewise some of the liquid may become atomized during its application or by the first rapid boiling and thus escape from the pan 95 and the surface of the drum. The resulting powder will drop to the bottom of the casing 1a with very little entrainment in the vapor flow, because of the very low density of the vapors. From time to time, therefore, the operation will be shut down, the manhole 108 opened and any accumulation of such powdery material removed. This manhole 108 also gives access to the apparatus for minor repairs and general servicing.

Although the continuous feed apparatus of Figures 3 and 4 is particularly adapted for drying of liquid materials, including colloidal dispersions, slurries, pastes, etc., similar to those which have been commonly handled on drum driers. The principles of this apparatus may be adapted for continuous drying by our invention of materials in solid form, either fresh or pre-frozen, e. g., whole small vegetables and fruits, such as peas, spinach leaves, berries, grapes, cherries, and the like, or halved, sliced or diced larger fruits, vegetables and meats, such as peaches, apples, beans, carrots, beets, sweet corn, etc. An apparatus suitable for such operation is shown diagrammatically in Figure 5.

In this figure is shown a vacuum chamber 1b designed to be used with the same evacuating system as is shown in Figures 1 and 2, this system being indicated merely by the throat 11 broken away in this figure.

Within the casing 3b a belt conveyor is enclosed consisting of rotatable drums 110 and 111 at each end, one of these being driven by a motor 117 with built-in gear reduction. The conveyor belt 113 over these drums may be of wire fabric, textile fabric or flexible sheet material, preferably of high heat conductivity and/or highly permeable to heat radiation.

In this apparatus a heating grille 4b is arranged close beneath the upper table of the belt and preferably is connected for flow of a heating fluid from a point near that at which the material is fed onto the belt 113 and thus supplies the greatest heating to the material which is being chilled by most rapid evaporation; and the grille is preferably designed and arranged so that from this point the heating fluid passes progressively toward the point at which the dried material is removed. This arrangement gives the greatest rapidity of drying. If, however, it should be desired to make fuller utilization of the heat in the heating fluid or to leave the heating fluid at a lower temperature, e. g., for use as a cooling fluid in some other process or other part of the same process, the direction of flow may be reversed, taking advantage of the very low temperature of the material as it first comes into the heated zone to withdraw heat from the already partially cooled heating fluid, while advantage is taken of the maximum temperature of the heating fluid in the area where the material has already been dried to a point at which its temperature can be safely raised from 20 to 50° F. or more (depending upon the material and degree of dryness attained) above that of the material when first exposed to the heating coil.

The grille 4b advantageously begins at a point beyond the feeding point so that for a brief period after feeding onto the belt 113 the material is subjected to chilling and freezing by rapid evaporation without heating. It will be understood, however, that if the material is pre-frozen this will not be necessary and likewise if a counter-current flow of the heating fluid is used, the heating may be so far reduced at the end of the grille adjacent the feed point as not to delay excessively the freezing of fresh materials.

The heating may be controlled as in the case illustrated in Figure 2 by controlling the temperature or rate of flow of the heating fluid either manually or automatically in response to the pressure in the shell 3b.

Rotary valves 115 are shown in this figure for feeding and discharging the materials. These are formed with circumferentially open, but otherwise air-tight, compartments, the partitions between these compartments having rounded ends each fitted to or accurately tangent to the same geometric cylinder to which the inside of the discharge openings 116 and 116' are also accurately ground and to which likewise the insides of the rubber mouths 118 and 118' are molded. As the valve member is rotated the material falls into the successive compartments of the rotary valve 115 and is carried therein to the opening at the bottom. Due to the vacuum within the shell 1b the rubber mouth 118 or 118' will tend to be drawn tightly against the rotary valve 115 and thus to keep a substantially effective seal against air leakage. Such leakage as may occur, as well as the air which is carried in the compartments from the opening in the rubber mouth 118 to the corresponding opening in the shell 3b where it merges into the cylindrical valve casing 116, expands into the vacuum within the shell 3b and is drawn off by the ejectors or other evacuating apparatus.

It is an advantage of the invention that the non-condensable gases thus entering the vacuum apparatus can be drawn off and handled together with the water vapor resulting from the drying without any separation of these or separate handling within the vacuum apparatus. This permits, if desired, the introduction of a small amount of air which will permit the evaporation of the frozen moisture at a somewhat higher total pressure, advantageously about 10 mm. above the water vapor pressure. The air in such case acts as a diluent gas which in sweeping through the vacuum drying chamber drives the water molecules to the exhaust.

What is claimed is:

1. The process of dehydrating food or other hydrous substance which comprises freezing such substance and subjecting it in a confined space to a reduced water vapor pressure below that at the melting point of the substance, removing water vapor directly from said space together with any other vapors and gases admixed therewith in said space, heating the material being dried while it is subjected to said reduced vapor pressure, and controlling the heat supplied to said material in response to the pressure within said space so that the heating is increased when the vapor pressure falls substantially below a predetermined value near but substantially less than the vapor pressure of said substance at its melting point and is decreased when the vapor pressure rises to said predetermined value.

2. The process as defined in claim 1, in which the predetermined value at which heating is decreased is between 3.5 and 2.0 mm. and the vapor removal operation proceeds substantially uniformly throughout.

3. The process as defined in claim 1, in which, when the vapor pressure falls belows a predetermined lower limit, notwithstanding a predetermined maximum rate of heating, the heating is increased, whereby final drying proceeds more rapidly at increased temperature.

4. The process as defined in claim 1, in which, after the substance has been dried to the point at which residual water therein is less than can hold solid constituents dispersed in an aqueous liquid phase, removal of vapors is terminated and said space is sealed and the heating increased, whereby residual vacuum in said space is utilized for final drying at increased temperature, and thereafter breaking the vacuum by introducing a gas substantially free from moisture.

5. The process of drying food or other hydrous substance which comprises freezing such substance, and subjecting it in a confined space to a reduced pressure below the water vapor pressure at the melting point of the substance, removing water vapor from said confined space to maintain the vapor pressure continuously below said vapor pressure at the melting point of the substance until said substance has been dried to the point at which residual water therein is less than can hold solids of said substance dispersed in an aqueous liquid phase, thereafter sealing said confined space and heating the substance until the vapor pressure therein is raised to many times said reduced pressure theretofore maintained and after much higher pressure has been attained, removing the dried substance from said space.

6. An apparatus for dehydrating food or other hydrous substance which comprises a vacuum-tight chamber adapted to contain such substance, means for continuously removing water vapor together with any fixed gases admixed therewith adapted to maintain a pressure below the vapor pressure of said substance at its melting point, means for heating said substance within said space and pressure-responsive means for regulating said heating means to increase the heating in response to a predetermined low pressure limit within said chamber and to decrease said heating in response to a predetermined high pressure limit within said chamber below said vapor pressure of said substance at its melting point.

7. An apparatus for dehydrating food or other hydrous substance which comprises a vacuum-tight chamber, means therein adapted to support such substance, steam jet ejector system for removing water vapor together with any fixed gases admixed therewith adapted to maintain a pressure below the vapor pressure of said substance at its melting point, a conduit passing adjacent said supporting means for circulating a heating fluid, a flow-controlling valve in said conduit and pressure-responsive means for operating said valve to increase the flow of said heating fluid in response to attainment of predetermined low pressure limit within said chamber and to decrease said flow in response to attainment of predetermined high pressure limit within said chamber below said vapor pressure of said substance at its melting point.

RAYMOND B. ROOS.
STEPHEN L. GALVIN.

REFERENCES CITED

The following references are of record in the file of this patent:

UNITED STATES PATENTS

| Number | Name | Date |
| --- | --- | --- |
| Re. 20,969 | Reichel | Jan. 3, 1939 |
| 626,579 | Viele | June 6, 1899 |
| 685,243 | Atwood | Oct. 29, 1901 |
| 741,436 | Atwood | Oct. 13, 1903 |
| 864,978 | Morel | Sept. 3, 1907 |
| 888,257 | Passburg | May 19, 1908 |
| 1,103,443 | Sleeper | July 14, 1914 |
| 1,143,634 | Lane et al. | June 22, 1915 |
| 1,275,547 | Forrest | Aug. 13, 1918 |
| 1,286,538 | Coleman | Dec. 3, 1918 |
| 1,358,431 | Field | Nov. 9, 1920 |
| 1,512,909 | Dohr | Oct. 28, 1924 |
| 1,580,658 | Field | Apr. 13, 1926 |
| 1,591,053 | Reavell | July 6, 1926 |
| 1,778,079 | Kristensson | Oct. 14, 1930 |
| 1,813,133 | Anhaltzer | July 7, 1931 |
| 1,933,819 | Miles et al. | Nov. 7, 1933 |
| 1,949,427 | McComb | Mar. 6, 1934 |
| 2,073,423 | Lacasse | Mar. 9, 1937 |
| 2,080,179 | Merriam et al. | May 11, 1937 |
| 2,086,446 | Smith, Jr., et al. | July 6, 1937 |
| 2,227,441 | Coleman | Jan. 7, 1941 |
| 2,284,913 | McComb | June 2, 1942 |
| 2,292,447 | Irwin, Jr. | Aug. 11, 1942 |
| 2,295,744 | Merriam | Sept. 15, 1942 |
| 2,302,253 | Reichel et al. | Nov. 17, 1942 |
| 2,345,548 | Flosdorf | Mar. 28, 1944 |
| 2,353,986 | Barr | July 18, 1944 |
| 2,374,232 | Pfeiffer et al. | Apr. 24, 1945 |
| 2,411,152 | Folsom | Nov. 19, 1946 |
| 2,414,940 | Flosdorf et al. | Jan. 28, 1947 |

FOREIGN PATENTS

| Number | Country | Date |
| --- | --- | --- |
| 8,269 | Australia | July 25, 1933 |
| 784,430 | France | Apr. 29, 1935 |
| 840,092 | France | Jan. 11, 1939 |

OTHER REFERENCES

"A Method of Drying Complement from the Frozen State," by James Craigie, pages 75–77 of the British Journal of Experimental Pathology, vol. 12, 1931.

"A Simple Method for Preserving Bacterial Culture by Freezing and Drying," by Homer F. Swift, pages 411–420 of Journal of Bacteriology, April 1937.

"The Preparation and Preservation of Human Plasma," by Strumia et al., pages 480–496 of American Journal of Clinical Pathology, vol. II, June 1941.